(12) United States Patent
Amend et al.

(10) Patent No.: US 11,165,893 B2
(45) Date of Patent: Nov. 2, 2021

(54) TECHNIQUES FOR PACKET DATA CONVERSION

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/975,149

(22) PCT Filed: Feb. 21, 2019

(86) PCT No.: PCT/EP2019/054265
§ 371 (c)(1),
(2) Date: Aug. 24, 2020

(87) PCT Pub. No.: WO2019/166310
PCT Pub. Date: Sep. 6, 2019

(65) Prior Publication Data
US 2021/0126989 A1     Apr. 29, 2021

(30) Foreign Application Priority Data
Feb. 28, 2018 (EP) .................................... 18159124

(51) Int. Cl.
*H04L 29/06* (2006.01)

(52) U.S. Cl.
CPC .............. *H04L 69/22* (2013.01); *H04L 69/08* (2013.01); *H04L 69/161* (2013.01); *H04L 69/169* (2013.01)

(58) Field of Classification Search
CPC ....... H04L 69/22; H04L 69/08; H04L 69/161; H04L 69/169
See application file for complete search history.

(56) References Cited

U.S. PATENT DOCUMENTS

2007/0071004 A1* 3/2007 Hasegawa ............. H04L 69/166
                                                                370/390
2007/0274210 A1  11/2007 Jeong-Rok
                          (Continued)

FOREIGN PATENT DOCUMENTS

CN            101080093 A     11/2007

OTHER PUBLICATIONS

Shafi et al., "An Alternate Encapsulation and Implementation of DCCP for Multimedia Applications", J. Basic Appl. Sci. Res., 3(1) 830-836, 2013. (Year: 2013).*

(Continued)

*Primary Examiner* — Saad A. Waqas
(74) *Attorney, Agent, or Firm* — Leydig, Voit & Mayer, Ltd.

(57) ABSTRACT

A first packet data conversion device for a sender includes a data interface and a converter. The data interface is configured to provide first packet data according to a first network protocol, in particular according to a Datagram Congestion Control Protocol (DCCP), wherein each packet of the first packet data comprises a first packet header. The converter is configured to convert the first packet data into second packet data. The conversion is based on rearranging contents of the first packet header, wherein the rearranged first packet header indicates that the second packet data is generated according to a second network protocol, in particular according to a User Datagram Protocol (UDP) or a UDP-Lite protocol. A length of the rearranged first packet header is equal to a length of the first packet header.

9 Claims, 9 Drawing Sheets

(56) References Cited

U.S. PATENT DOCUMENTS

| | | | |
|---|---|---|---|
| 2010/0177786 A1* | 7/2010 | Signaoff | H04L 29/12924 |
| | | | 370/466 |
| 2011/0142063 A1* | 6/2011 | Kasturi | H04L 69/326 |
| | | | 370/401 |
| 2013/0279409 A1 | 10/2013 | Burgess et al. | |
| 2014/0157405 A1* | 6/2014 | Joli | H04L 63/1425 |
| | | | 726/22 |
| 2017/0366395 A1* | 12/2017 | Goldfarb | H04L 12/4641 |
| 2017/0366445 A1* | 12/2017 | Nemirovsky | H04L 45/24 |
| 2018/0018713 A1* | 1/2018 | Burleigh | G06F 16/958 |

OTHER PUBLICATIONS

Phelan Sonus Networks T, "Datagram Congestion Control Protocol (DCCP) Encapsulation for NAT Traversal (DCCP-NAT)," *Datagram Congestion Control Protocol* (Feb. 14, 2008). XP015054476.
Phelan Sonus G Fairhurst University of Aberdeen C Perkins University of Glasgow, "DCCP-UDP: A Datagram Congestion Control Protocol UDP Encapsulation for NAT Traversal; rfc6773.txt," *DCCP-UDP: A Datagram Congestion Control Protocol UDP Encapsulation for NAT Traversal*: 1 -20 (Nov. 14, 2012). XP015086487.
T. Phelan, et al., "DCCP-UDP: A Datagram Congestion Control Protocol UDP Encapsulation for NAT Traversal", Internet Engineering Task Force (IETF), Nov. 23, 2012, pp. 1-20.

\* cited by examiner

TECHNIQUES FOR PACKET DATA CONVERSION

CROSS-REFERENCE TO PRIOR APPLICATIONS

This application is a U.S. National Phase Application under 35 U.S.C. § 371 of International Application No. PCT/EP2019/054265, filed on Feb. 21, 2019, and claims benefit to European Patent Application No. EP 18159124.9, filed on Feb. 28, 2018. The International Application was published in English on Sep. 6, 2019 as WO 2019/166310 A1 under PCT Article 21(2).

TECHNICAL FIELD

The invention relates to techniques for packet data conversion, in particular for conversion of DCCP (Datagram Congestion Control Protocol) packet data such that it looks like UDP (User Datagram Protocol) packet data, in order to transmit the converted DCCP packet data over a middle box that supports only UDP packet data. The invention further relates to DCCP header converter devices for UDP like appearance.

BACKGROUND

The Transmission Control Protocol (TCP) according to "University of Southern California, *TRANSMISSION CONTROL PROTOCOL*" RFC no. 793, September 1981" is widely used in today's computer networks to ensure reliable data transfer on OSI (Open System Interconnection) Layer 4. Therefore it uses congestion control to adapt to path characteristics and flow control to enable reliable in-order delivery, which can cause head-of-line blocking. Especially the head-of-line blocking is an unwanted feature from an application perspective, e.g. for real-time communication. Most of such applications use therefore the OSI Layer 4 User Datagram Protocol (UDP) according to J. Postel, "User Datagram Protocol RFC no. 768, 28 Aug. 1980", which is stateless and does not include any congestion- or flow-control. Alternatively, UDP-Lite according to RFC3828 may be used which has the protocol number 136 instead of 17 for UDP. To ensure path adaption, the applications mostly implement an own congestion control on top which is time consuming and error-prone. Another OSI Layer 4 protocol exists which solves this issue: The plain old Datagram Congestion Control Protocol (DCCP) according to "E. Kohler, M Handley, S. Floyd, *Datagram Congestion Control Protocol (DCCP)*", RFC no. 4340, March 2006" is a protocol, which inherits TCP like congestion control, without ensuring (in-order) delivery. Applications, which use it, can leave congestion control to Layer 4 without taking care.

In principle with DCCP it seems it might be a good alternative for many applications, which use UDP today and implement their own congestion control. However, DCCP has the classic chicken-and-egg problem. Because it is not widely deployed, middle boxes often block it on the way to the destination and that is again the reason for not using DCCP as application developer. TCP and UDP are the only protocols from which a reasonable acceptance by the middle boxes can be expected.

SUMMARY

In an exemplary embodiment, the present invention provides a first packet data conversion device for a sender. The first packet data conversion device includes a data interface and a converter. The data interface is configured to provide first packet data according to a first network protocol, in particular according to a Datagram Congestion Control Protocol (DCCP), wherein each packet of the first packet data comprises a first packet header. The converter is configured to convert the first packet data into second packet data. The conversion is based on rearranging contents of the first packet header, wherein the rearranged first packet header indicates that the second packet data is generated according to a second network protocol, in particular according to a User Datagram Protocol (UDP) or a UDP-Lite protocol. A length of the rearranged first packet header is equal to a length of the first packet header.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Exemplary embodiments of the present invention efficiently distribute DCCP data traffic over middle boxes that are designed for UDP or TCP data traffic.

Exemplary embodiments of the present invention provide for efficient transmission of data traffic over network devices that support only specific network protocols.

To overcome the challenge of traversing middle boxes like firewalls and NAT (network address translation), exemplary embodiments of the present invention provide for converting DCCP to UDP.

This disclosure provides two different types of converter devices, which transform DCCP datagrams such that they look like UDP. A DCCP connection utilizes at least two converter devices, one for transforming it to UDP and another one to transform it back to DCCP as shown in FIG.

Figure 2:
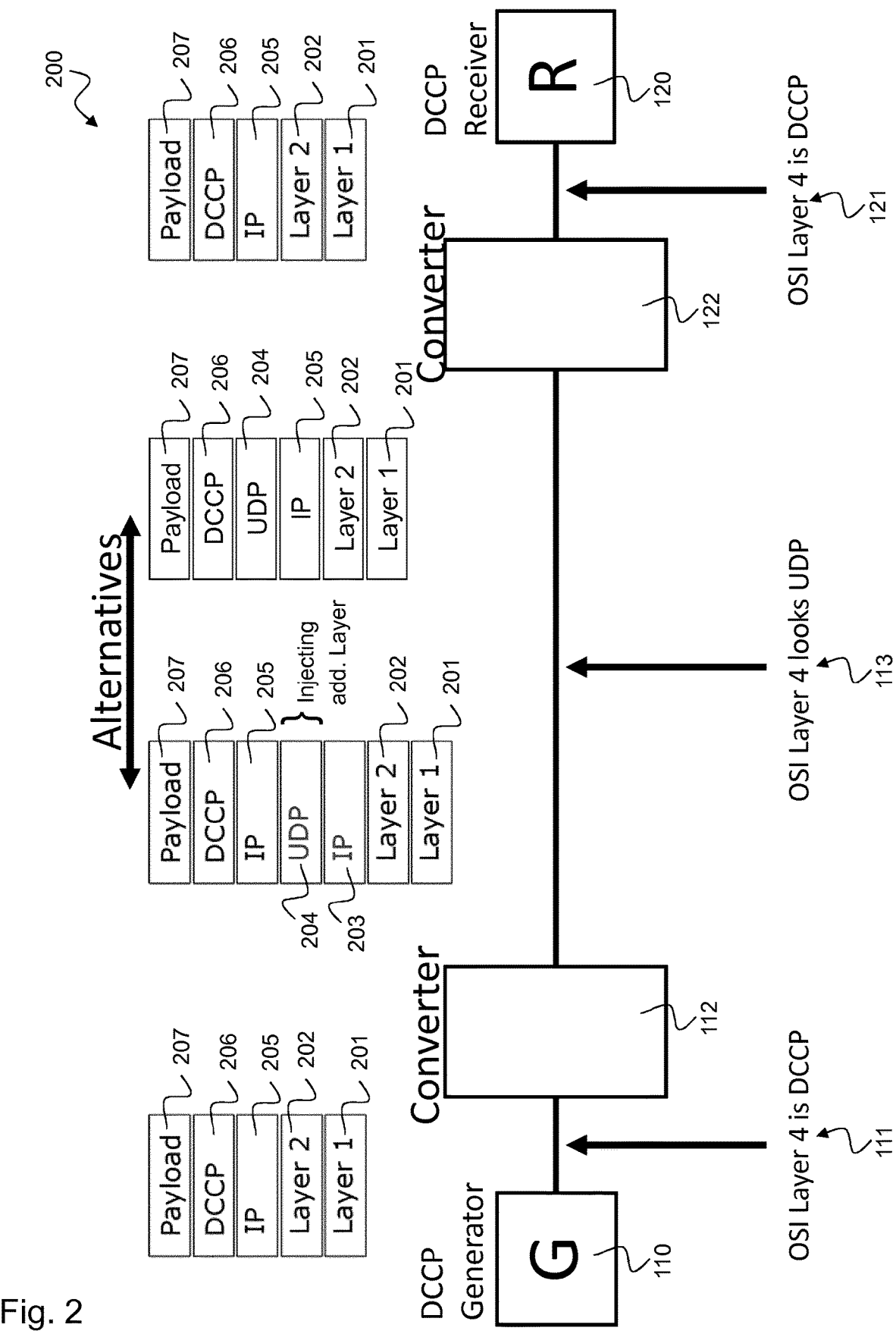
FIG. 2 shows a block diagram illustrating an OSI layer view of a DCCP over UDP transmission system 200.

1. A first solution is to encapsulate first each DCCP datagram on the send converter into a UDP datagram and second strip it again in the receiver converter, which can be also described as DCCP over UDP transmission as shown in FIG. 2. This provides simplicity and has the impact to change the size proportion by injecting at least an additional UDP header and eventually a header of the OSI network layer, e.g. IP. Thereby, overhead is introduced which needs at least to be transferred and may lead in addition to fragmentation and/or payload reduction. A second solution is based on converting the DCCP header (see FIG. 3) to look like UDP as exemplarily shown in FIGS. 6 and 7. A general representation of this second solution is shown in FIG. 8.

The methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

In the following, network protocols, also denoted as communication protocols, are described. A network protocol is a system of rules that allow two or more entities of a communications system to transmit information via a communication channel or transmission medium. The network protocol defines the rules "Syntax", "Semantic" and "Synchronization" of communication and possible error detection and correction. Network protocols may be implemented by computer hardware, software, or a combination of both. Communicating systems use well-defined formats for exchanging various messages. Each message has an exact meaning intended to elicit a response from a range of possible responses pre-determined for that particular situation. The specified behavior is typically independent of how it is to be implemented. Communication protocols have to be agreed upon by the parties involved. To reach agreement, a network protocol may be developed into a technical standard. Multiple protocols often describe different aspects of a single communication. A group of (network) protocols designed to work together are known as a (network) protocol suite; when implemented in software they are a (network) protocol stack. Internet communication protocols are published by the Internet Engineering Task Force (IETF). The IEEE handles wired and wireless networking, and the International Organization for Standardization (ISO) handles other types.

In communications and computing systems, the Open Systems Interconnection model (OSI model) defines a conceptual model that characterizes and standardizes the communication functions without regard to its underlying internal structure and technology. Its goal is the interoperability of diverse communication systems with standard protocols. The model partitions a communication system into abstraction layers. The original version of the model defined seven layers: Physical layer (Layer 1), Data Link layer (Layer 2), Network layer (Layer 3), Transport layer (Layer 4), Session layer (Layer 5), Presentation layer (Layer 6) and Application layer (Layer 7).

According to a first aspect the invention relates to a first packet data conversion device for a sender, the packet data conversion device comprising: a data interface configured to provide first packet data according to a first network protocol, in particular according to a Datagram Congestion Control Protocol (DCCP), wherein each packet of the first packet data comprises a first packet header; and a converter configured to convert the first packet data into second packet data, wherein the conversion is based on rearranging contents of the first packet header, wherein the rearranged first packet header indicates that the second packet data is generated according to a second network protocol, in particular according to a User Datagram Protocol (UDP) or to a UDP-Lite Protocol.

Such a first packet data conversion device provides efficient distribution of DCCP data traffic over middle boxes that are designed for UDP (or UDP-Lite) or TCP data traffic since the rearranged first packet header indicates that the second packet data is generated according to a second network protocol, in particular according to UDP or according to UDP-Lite. In particular, such a first packet data conversion device provides efficient transmission of data traffic over network devices that support only specific network protocols, namely the second network protocol but blocks data traffic according to the first network protocol. UDP-Lite is even easier with respect to re-arrangement, because it already comprises data fields for ports, CsCov and Chksum (checksum).

In an exemplary implementation form of the first packet data conversion device, a length of the rearranged first packet header is equal to a length of the first packet header.

This provides the advantage that the converter does not change the size of the first packet header and avoids introducing overhead. Hence no overhead has to be additionally transmitted which may result in fragmentation and/or payload reduction.

In an exemplary implementation form of the first packet data conversion device, a length of a packet of the second packet data is equal to a length of a corresponding packet of the first packet data.

This provides the advantage that the converter does not change the size of the whole first packet data and avoids introducing overhead. Hence no overhead has to be additionally transmitted which may result in fragmentation and/or payload reduction.

In an exemplary implementation form of the first packet data conversion device, the conversion is further based on changing a protocol field of the first packet header from indicating the first network protocol to indicating the second network protocol.

This provides the advantage that network devices within the transmission path between sender and receiver, so called middle boxes, can detect the second network protocol in the protocol field and hence will pass the first packet data if they are designed to transmit data traffic according to the second network protocol, e.g. UDP data traffic or UDP-Lite data traffic.

In an exemplary implementation form of the first packet data conversion device, the first packet header comprises an Internet Protocol (IP) header, and the protocol field is a protocol field of the IP header.

This provides the advantage that Internet routers and/or gateways can detect the protocol field of the IP header and may forward the first packet data.

In an exemplary implementation form of the first packet data conversion device, the converter is configured to change the protocol field from a value of 33 indicating the DCCP protocol to a value of 17 indicating the UDP protocol or to a value of 136 indicating the UDP-Lite protocol.

This provides the advantage that typical middle boxes that are designed to transfer UDP (or UDP-Lite) or TCP data traffic are able to detect the first packet data as being UDP (or UDP-Lite) data traffic. Hence, first packet data is not blocked by such middle boxes.

In an exemplary implementation form of the first packet data conversion device, the conversion is further based on extending a checksum coverage field (CsCov) of a respective packet of the first packet data, wherein the CsCov indicates a range of the respective packet which is covered by a checksum.

This provides the advantage that the checksum can be extended over a broader range of the first packet data resulting in more reliable transmission.

In an exemplary implementation form of the first packet data conversion device, the CsCov is extended to a size of a length field comprised in a packet header of the second network protocol, in particular a packet header of the UDP protocol or of the UDP-Lite protocol.

This provides the advantage that the CsCov can be interpreted as the UDP (or UDP-Lite) length field and thus, first packet data is interpreted as UDP (or UDP-Lite) traffic by usual middle boxes which are designed to forward UDP (or UDP-Lite) traffic but to block DCCP or other traffic.

In an exemplary implementation form of the first packet data conversion device, the conversion is further based on rearranging at least one of a type field, a CCVal field and a data offset field of the first packet header to another position in the rearranged first packet header.

This provides the advantage that these type, CCVal and data offset fields can be shifted further back in the first packet header, e.g. at positions that are not checked by middle boxes to identify UDP (or UDP-Lite) data traffic.

In an exemplary implementation form of the first packet data conversion device, the rearranged first packet header comprises the following data fields, in particular in the following sequence: a source port, a destination port, a checksum coverage, CsCov, a checksum, a type, a CCVal, a data offset and a sequence number.

This provides the advantage that the first part of the rearranged first packet header which includes the source port, the destination port, the checksum coverage, CsCov, and the checksum looks like a UDP (or UDP-Lite) header. When checking this first part by typical middle boxes, the first packet data is identified as UDP data traffic.

In an exemplary implementation form of the first packet data conversion device, the first packet data and the second packet data are segmented data streams according to an OSI layer 4 representation.

This provides the advantage that the services of the transport layer (Layer 4) according to the OSI specification can be provided, e.g. connection-oriented communication, same order delivery, reliability, flow control, congestion control and multiplexing.

According to a second aspect, the invention relates to a second packet data conversion device for a receiver, the second packet data conversion device comprising: a data interface configured to receive second packet data according to a second network protocol, in particular according to a User Datagram Protocol (UDP) or according to a UDP-Lite protocol, wherein each packet of the second packet data comprises a second packet header; and a converter configured to convert the second packet data into first packet data, wherein the conversion is based on rearranging contents of the second packet header, wherein the rearranged second packet header indicates that the first packet data is generated according to a first network protocol, in particular according to a Datagram Congestion Control Protocol (DCCP).

Such a second packet data conversion device provides efficient distribution of DCCP data traffic over middle boxes that are designed for UDP (or UDP-Lite) or TCP data traffic since the second packet header indicates that the second packet data is generated according to a second network protocol, in particular according to UDP (or UDP-Lite) and hence can pass these middle boxes. The converter of the second packet data conversion device reconverts the transmitted data traffic back to its original network protocol, namely to the first network protocol, in particular DCCP. Such a second packet data conversion device provides (together with the above-described first packet data conversion device) efficient transmission of data traffic over network devices that support only specific network protocols, namely the second network protocol but block data traffic according to the first network protocol.

According to a third aspect, the invention relates to a transmission system, comprising: a sender configured to send first packet data over a transmission channel, wherein the sender comprises a first packet data conversion device according to the first aspect, which is configured to convert the first packet data into second packet data before sending; and a receiver configured to receive second packet data via the transmission channel, wherein the receiver comprises a second packet data conversion device according to the second aspect, which is configured to convert the second packet data into first packet data after reception.

Such a transmission system provides efficient distribution of first packet data that is generated according to a first network protocol over a transmission channel having transmission paths supporting only transmission of data traffic generated according to a second network protocol since the first packet header looks like a packet header of the second network protocol.

In an exemplary implementation form, the transmission system comprises a middle box between the sender and the receiver, wherein the middle box is configured to transfer data according to the second network protocol, in particular according to the UDP (or UDP-Lite) protocol and block data according to the first network protocol, in particular according to the DCCP protocol.

Such a transmission system provides efficient distribution of DCCP data traffic over middle boxes that support only UDP (or UDP-Lite) or TCP data traffic, since the DCCP header is rearranged resembling a UDP header.

According to a fourth aspect, the invention relates to a method for packet data conversion, the method comprising: providing first packet data according to a first network protocol, in particular according to a Datagram Congestion Control Protocol (DCCP), wherein each packet of the first packet data comprises a first packet header; and converting the first packet data into second packet data, wherein the converting is based on rearranging contents of the first packet header, wherein the rearranged first packet header indicates that the second packet data is generated according to a second network protocol, in particular according to a User Datagram Protocol (UDP) or according to a UDP-Lite protocol.

Such a method provides efficient distribution of DCCP data traffic over middle boxes that are designed for UDP (or UDP-Lite) or TCP data traffic since the rearranged first packet header indicates that the second packet data is generated according to a second network protocol, in particular according to UDP (or UDP-Lite). In particular, such a method provides efficient transmission of data traffic over network devices that support only specific network protocols, namely the second network protocol but blocks data traffic according to the first network protocol.

According to a fifth aspect the invention relates to a computer program product comprising program code for performing the method according to the fourth aspect of the invention, when executed on a computer or a processor.

Embodiments of the invention can be implemented in hardware and/or software.

The following acronyms are applied in this disclosure:
API Application Interface
DCCP Datagram Congestion Control Protocol
IP Internet Protocol
OSI Open System Interconnection
TCP Transport Control Protocol
UDP User Datagram Protocol In the following detailed description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
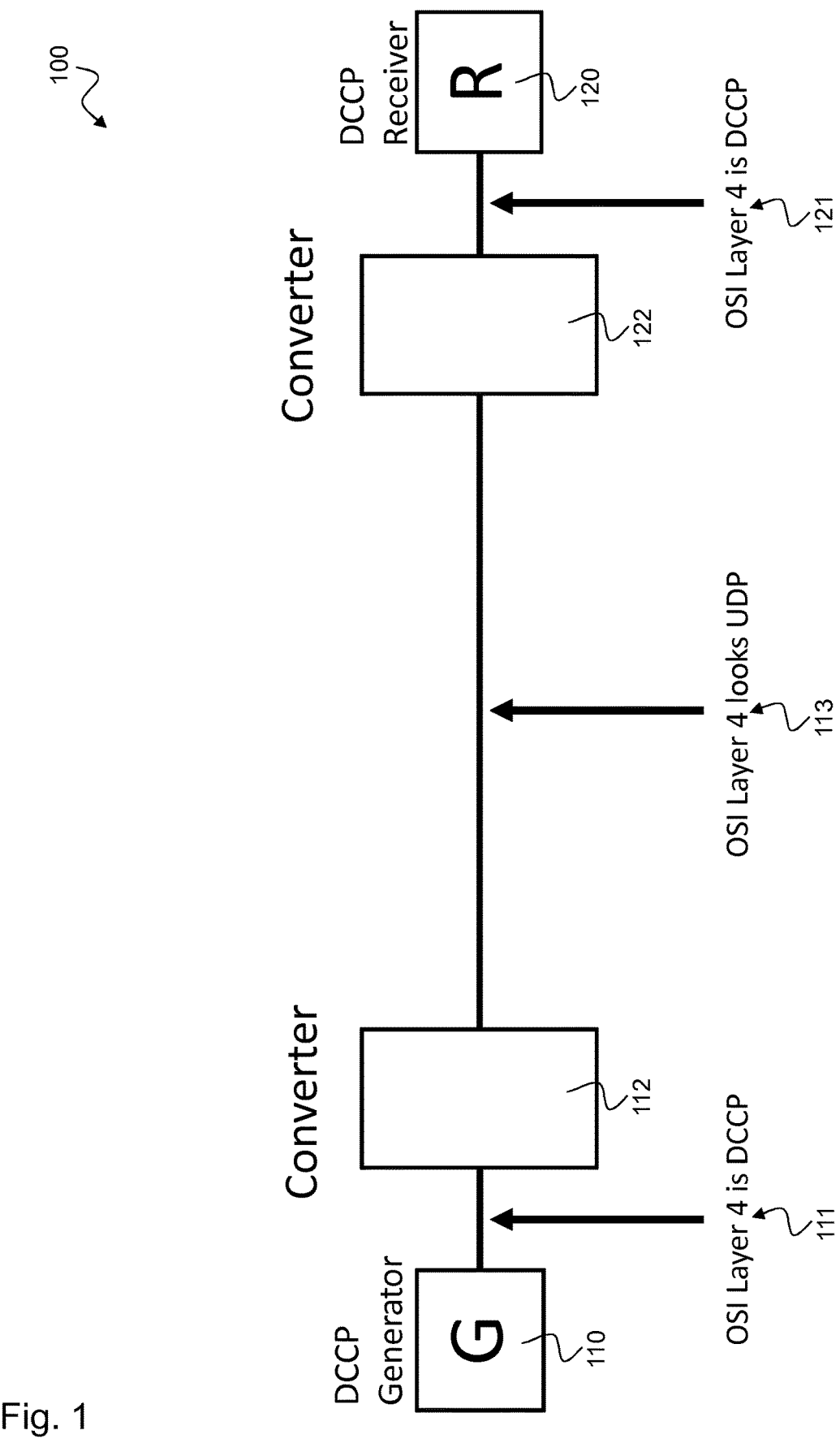
FIG. 1 shows a block diagram illustrating an exemplary DCCP UDP converter architecture 100.

FIG. 1 shows a block diagram illustrating an exemplary DCCP UDP converter architecture 100. A DCCP connection utilizes at least two converter devices 112, 122, one 112 (left-hand side of FIG. 1) for transforming it to UDP and another one 122 (right-hand side of FIG. 1) to undo it. At the sender side, i.e. left side of FIG. 1, a DCCP generator 110 generates a DCCP data stream 111 at OSI layer 4 according to the Open System Interconnection (OSI) reference model. The converter 112 on the sender side converts this DCCP data stream 111 in a converted data stream (on OSI layer 4) 113 that looks like UDP. At the receiver side, i.e. right-hand side of FIG. 1, the converter 122 at the receiver side (re-)converts this converted data stream looking like UDP into a re-converted DCCP data stream 121 (on OSI layer 4) which is then forwarded to DCCP receiver 120.

The converter devices 112, 122 can be designed to support two different kinds of conversion techniques for transforming DCCP datagrams that they look like UDP. A first one (shown in FIG. 2) is based on encapsulating each DCCP datagram on the send converter into a UDP datagram, according to DCCP over UDP transmission, while the second one (shown in FIGS. 6 and 7) is based on rearranging the contents of the DCCP header in such a manner that it looks like a UDP header. Both techniques allow DCCP packet data to pass middle boxes in between sender and receiver which are designed to support UDP data traffic but to block DCCP data traffic.

FIG. 2 shows a block diagram illustrating an OSI layer view of a DCCP over UDP transmission system 200. The transmission system 200 corresponds to the system described above with respect to FIG. 1 in which the converters 112, 122 are designed to first encapsulate each DCCP datagram on the send converter 112 into a UDP datagram, according to DCCP over UDP transmission and second strip it again in the receiver converter 122.

In the example of FIG. 2, the DCCP data stream 111 includes Layer 1, 201, Layer 2, 202, an IP layer 205 as Layer 3, a DCCP layer 206 as Layer 4 and the payload 207 as higher Layers. After the send converter 112 the converted data stream 113 additionally includes an encapsulated IP layer 203 and an encapsulated UDP layer 204 as shown in the middle left section of FIG. 2 or alternatively an encapsulated UDP layer 204 between IP layer 205 and DCCP layer 206 as shown in the middle right section of FIG. 2. After the receive converter 112 these additional layers 203, 204 (first alternative) or this single additional layer 204 (second alternative) are stripped again resulting in the receive DCCP data stream 121 that has the same structure than the original DCCP data stream 111, i.e. including Layer 1, 201, Layer 2, 202, IP layer 205 as Layer 3, DCCP layer 206 as Layer 4 and the payload 207 as higher Layers.

The solution according to FIG. 2 is rather simple. On the other hand, it changes the size proportion by injecting at least an additional UDP header 204 and eventually a header of the OSI network layer, e.g. IP 203. Thereby, overhead is introduced which needs at least to be transferred and may lead in addition to fragmentation and/or payload reduction.

Figure 3:
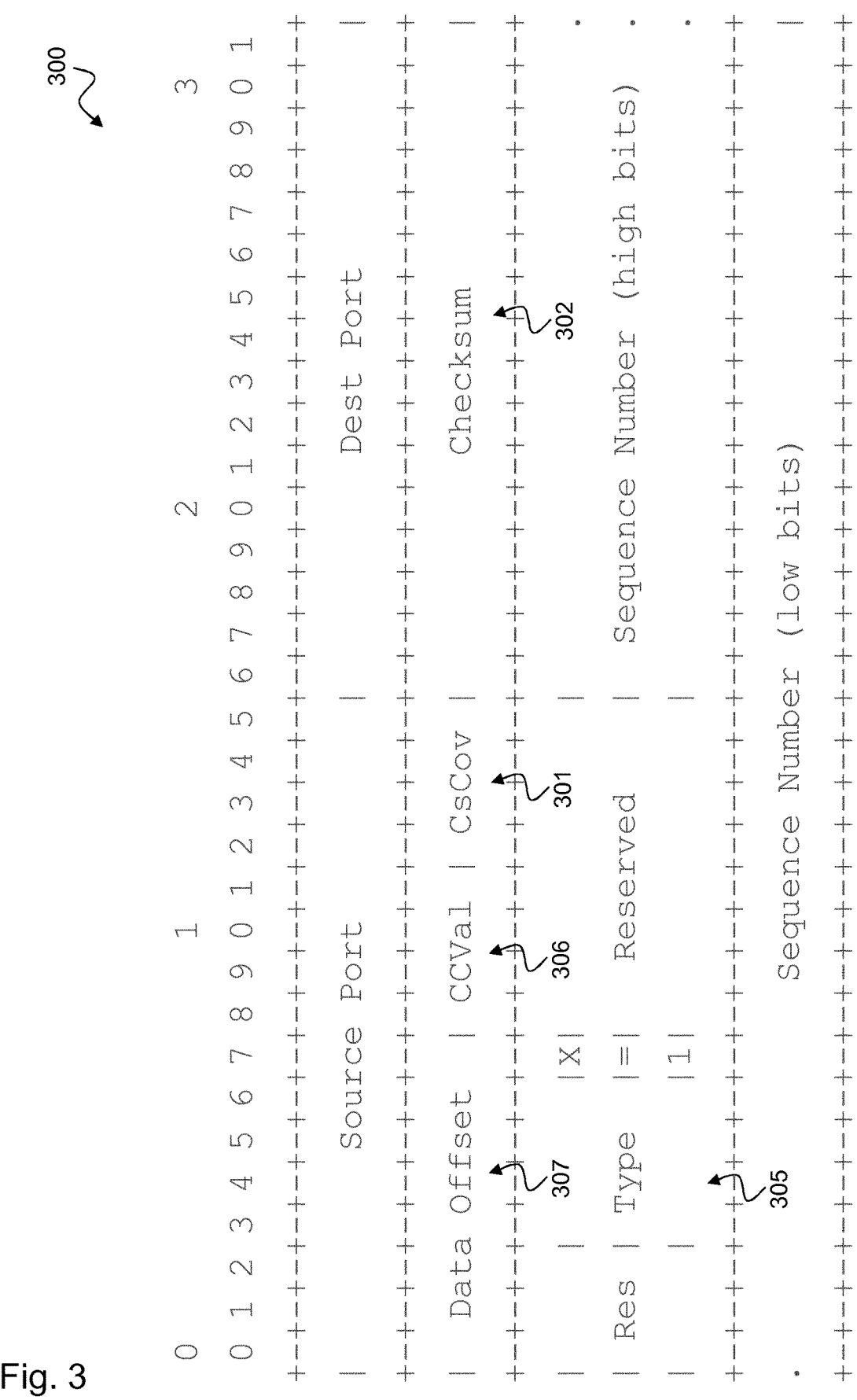
FIG. 3 shows a bit diagram illustrating a DCCP header structure 300 according to RFC 4340.

FIG. 3 shows a bit diagram illustrating a DCCP header structure 300 of a DCCP network protocol according to RFC 4340. The Datagram Congestion Control Protocol (DCCP) is a message-oriented transport layer protocol. DCCP implements reliable connection setup, teardown, Explicit Congestion Notification (ECN), congestion control, and feature negotiation. DCCP provides a way to gain access to congestion-control mechanisms without having to implement them on layers higher than layer 4. It allows for flow-based semantics like in Transmission Control Protocol (TCP), but does not provide reliable in-order delivery. A DCCP connection contains acknowledgment traffic as well as data traffic.

The DCCP header 300 includes a source port (16 bit), a destination port (16 bit), a data offset (8 bit) 307, a CCVal (4 bit) 306, a checksum coverage, CsCov, (4 bit) 301, the checksum (16 bit), a reserved bit field (3 bit), a type field (4 bit), an X=1 field (1 bit), a further reserved bit field (8 bit), a sequence number (high bits) (16 bit) and a sequence number (low bits) (32 bit).

According to the second solution as described above with respect to FIG. 1, the contents of the DCCP header, in particular the data offset 307, the CCVal 306, the CsCov 301 and the type 305 bit fields are rearranged in such a manner that it looks like a UDP header as described below. In some embodiment, the CsCov 301 bit field is additionally converted to a respective length and/or value field of the UDP header. Checksum Coverage, CsCov, determines the parts of the packet that are covered by the Checksum field. This second solution does not have the drawback of injecting extra information as in the first solution described above with respect to FIG. 2. Instead, this second solution exploits the already used space of the DCCP header and rearranges the header content.

Figure 4:
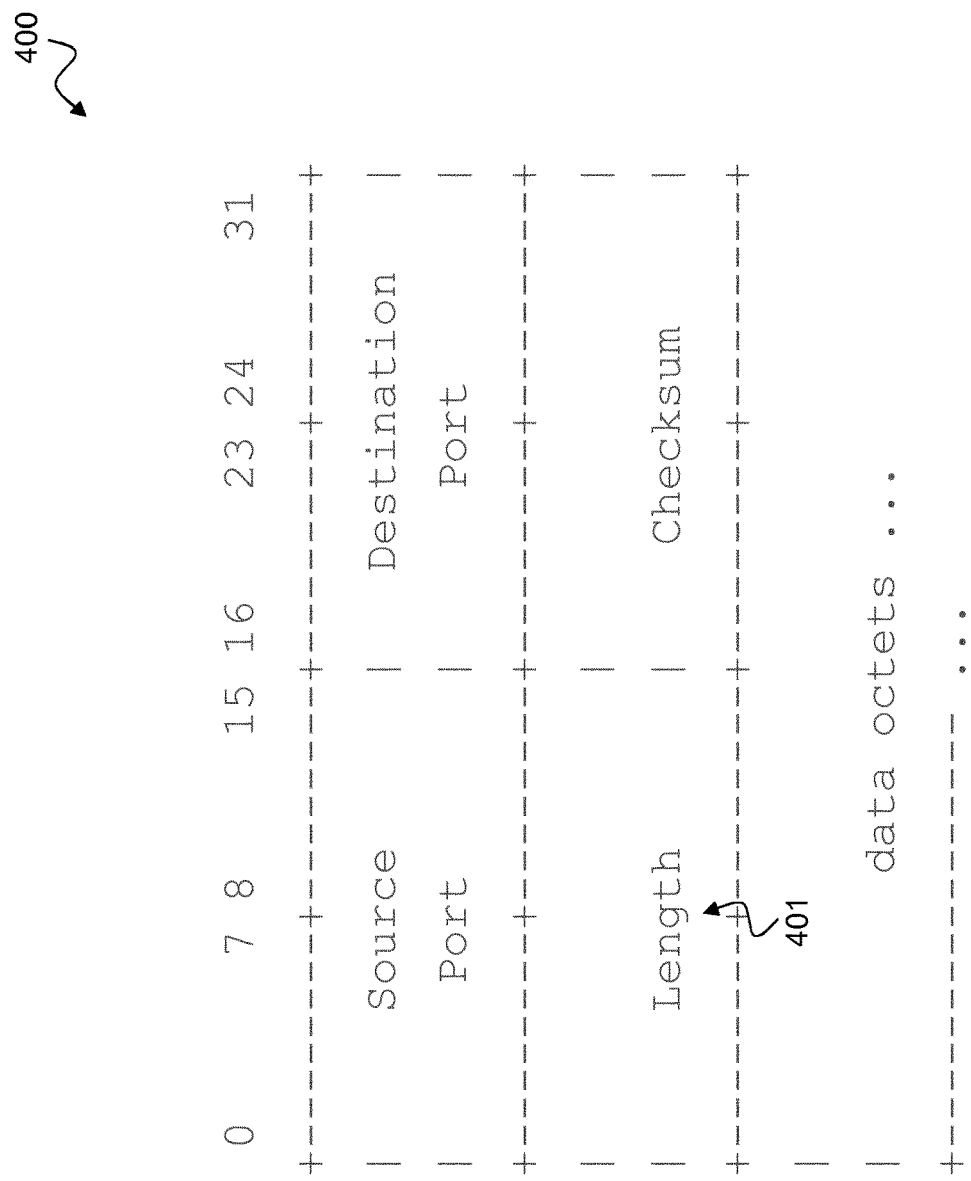
FIG. 4 shows a bit diagram illustrating a UDP header structure 400 according to RFC 768.

FIG. 4 shows a bit diagram illustrating a UDP header structure 400 of a UDP network protocol according to RFC 768. With the User Datagram Protocol (UDP), computer applications can send messages, in this case referred to as datagrams, to other hosts on an Internet Protocol (IP) network. Prior communications are not required in order to set up communication channels or data paths. UDP uses a simple connectionless communication model with a minimum of protocol mechanism. UDP provides checksums for data integrity, and port numbers for addressing different functions at the source and destination of the datagram. It has no handshaking dialogues, and thus exposes the user's program to any unreliability of the underlying network. There is no guarantee of delivery, ordering, or duplicate protection.

The UDP header 400 includes a source port (16 bit), a destination port (16 bit), a length field 401 and a checksum. In some embodiments, source port, destination port and checksum, depending on CsCov, can be the same as in the DCCP header 300 shown in FIG. 3. In some embodiments, the checksum may be recalculated due to the rearrangement. If the CsCov field 301 of the DCCP header 300 is enlarged to a 16 bit value and the CCVal 306 and Data Offset 307 are shifted to some other position in the rearranged DCCP header, this rearranged DCCP header looks like the UDP header 400 shown in FIG. 4. Additionally it behaves like a valid UDP packet in the case of a middle box checking length and checksum.

Figure 5:
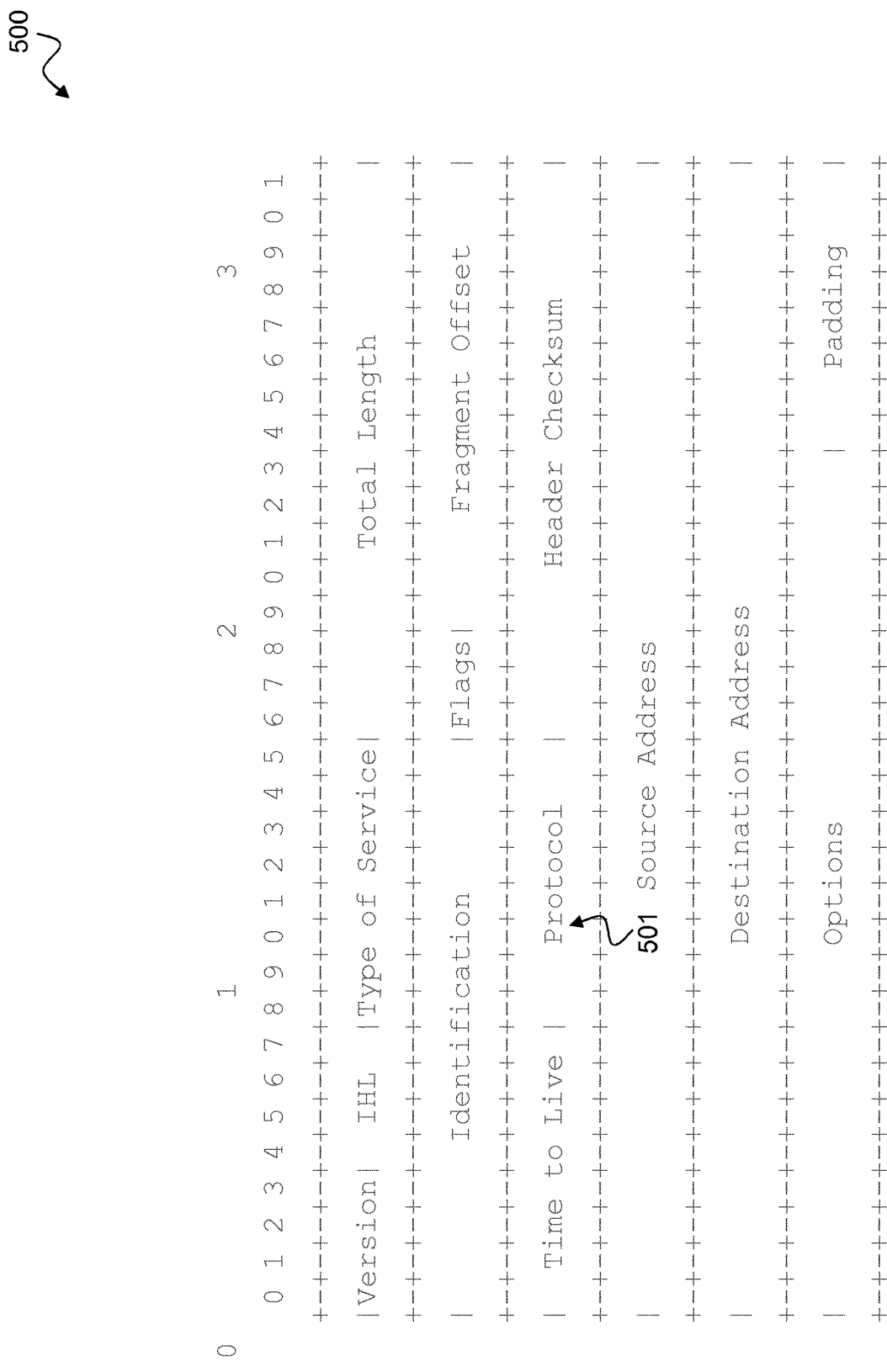
FIG. 5 shows a bit diagram illustrating an IP header structure 500 according to RFC 791.

FIG. 5 shows a bit diagram illustrating an IP header structure 500 of an IP network protocol according to RFC 791. The Internet Protocol (IP) is responsible for addressing hosts, encapsulating data into datagrams (including fragmentation and reassembly) and routing datagrams from a source host to a destination host across one or more IP networks. For these purposes, the Internet Protocol defines the format of packets and provides an addressing system. Each datagram has two components: a header and a payload. The IP header includes source IP address, destination IP address, and other metadata needed to route and deliver the datagram. The payload is the data that is transported. This method of nesting the data payload in a packet with a header is called encapsulation.

The IP header includes different bit fields such as Version, IHL, Type of Service, Total Length, Identification, Flags, Fragment Offset, Time to Live, Protocol, Header Checksum, Source Address, Destination Address, Options and Padding. For the second solution as described above with respect to FIG. 1, together with the rearrangement of the header contents, the converter devices change the "Protocol" field 501 in the IP header 500 to either 17;UDP (send converter) or 33;DCCP (receiver converter). In an alternative embodiment using the UDP-Lite protocol according to RFC 3828, the converter devices change the "Protocol" field 501 in the IP header 500 to either 136;UDP-Lite (send converter) or 33;DCCP (receiver converter).

FIG. 5 shows the original IP header (IPv4) according to RFC 791. The solution can also be applied to IP headers of IPv6 according to RFC 2460. The protocol field has to be correspondingly changed.

Figure 6:
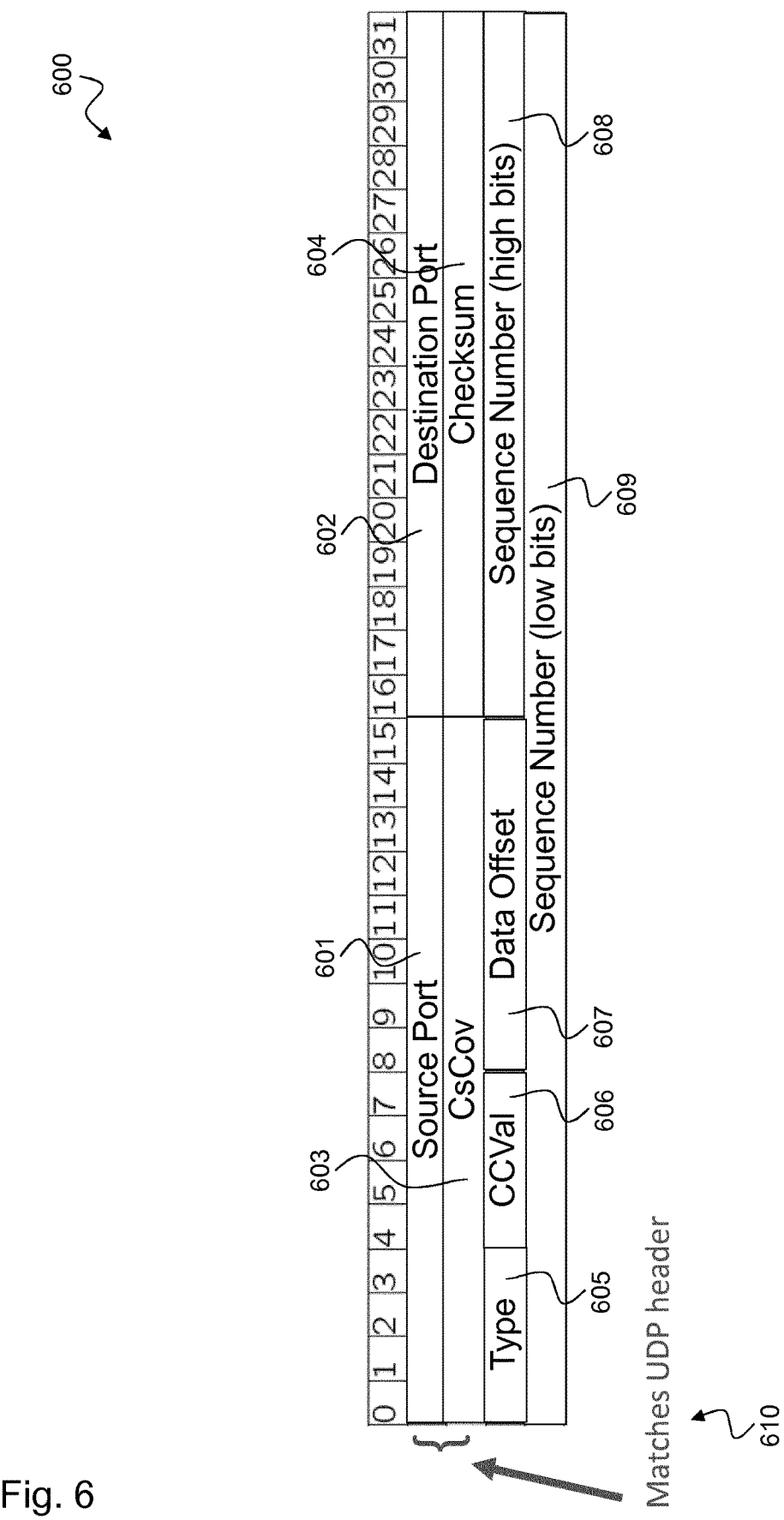
FIG. 6 shows a bit diagram illustrating an exemplary DCCP to UDP header conversion 600 according to the disclosure.

FIG. 6 shows a bit diagram illustrating an exemplary DCCP to UDP header conversion 600 according to the disclosure. The converted header 600 includes the following bit fields: Source Port 601, Destination Port 602, CsCov 603, Checksum 604, Type 605, CCVal 606, Data Offset 607, Sequence Number (high bits) 608 and Sequence Number (low bits) 609. Compared to the DCCP header 300 shown in FIG. 3, Source Port, 601, Destination Port 602 and Checksum 604 are at the same location while CsCov 603 is enlarged to a 16 bit value. Data Offset 307, CCVal 306 and Type 605 are shifted to some other position, and Sequence Number (high bits) 608 and Sequence Number (low bits) 609 are at the same location. The reserved bit fields and X=1 bit field of DCCP header 300 are removed. The converted header 600 now matches 610 the UDP header 400 as shown in FIG. 4 since the CsCov bit field 603 of the converted header 600 resembles the length bit field 401 of the UDP header 400.

With this, each datagram between the converters looks like UDP without losing DCCP relevant information. Together with the rearrangement, the converter device changes the "Protocol" field in the IP header as described above with respect to FIG. 5 to either 17;UDP (send converter) or 33;DCCP (receiver converter). In an alternative embodiment using the UDP-Lite protocol according to RFC 3828, the converter device changes the "Protocol" field in the IP header as described above with respect to FIG. 5 to either 136;UDP-Lite (send converter) or 33;DCCP (receiver converter). Additionally it behaves like a valid UDP (or UDP-Lite) packet in the case of a middle box checking length and checksum. The resulting architecture and relevant OSI layer change is shown in FIG. 7.

Figure 7:
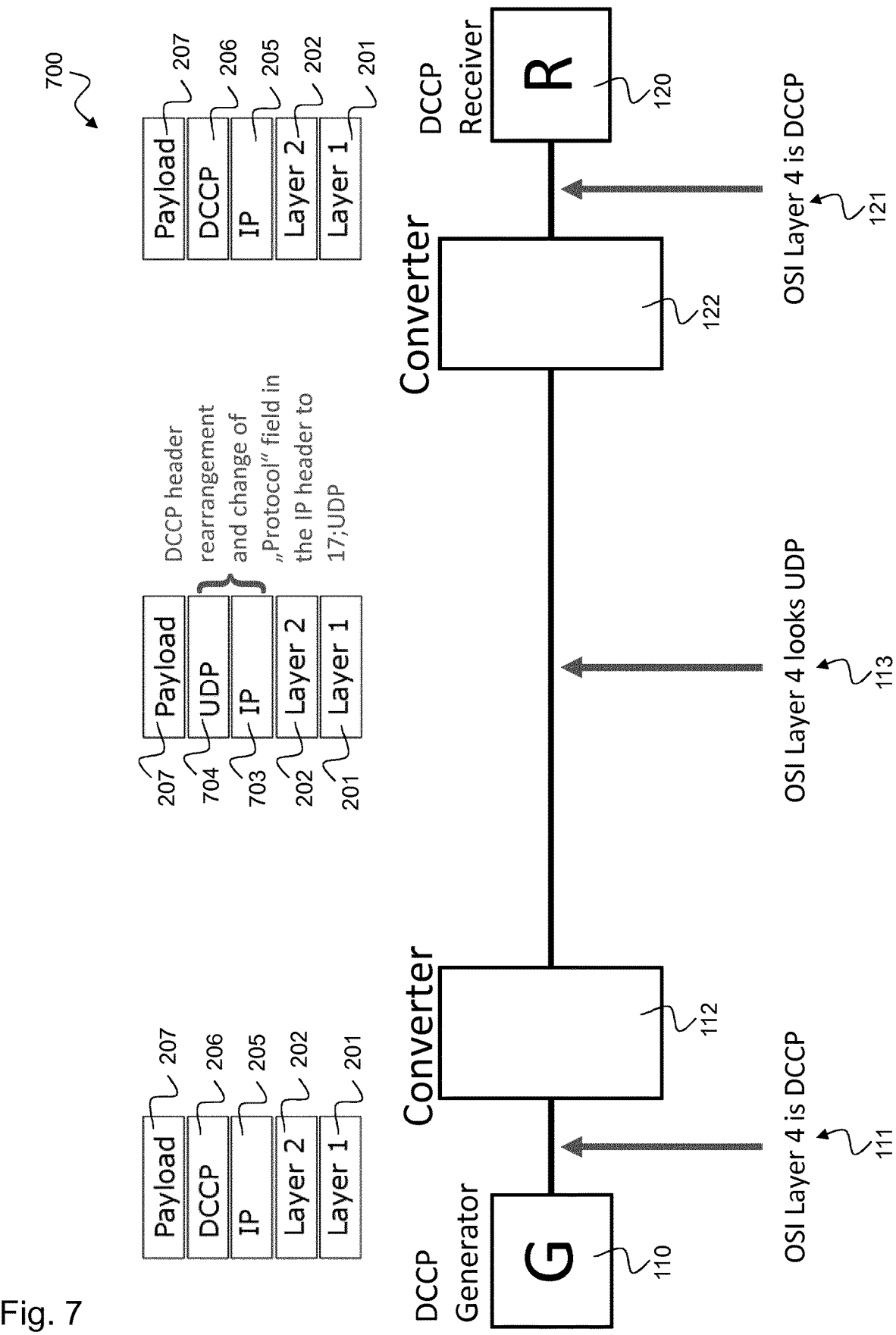
FIG. 7 shows a block diagram illustrating an OSI layer view of a transmission system 700 with an exemplary DCCP to UDP header conversion according to the disclosure.
Figure 8:
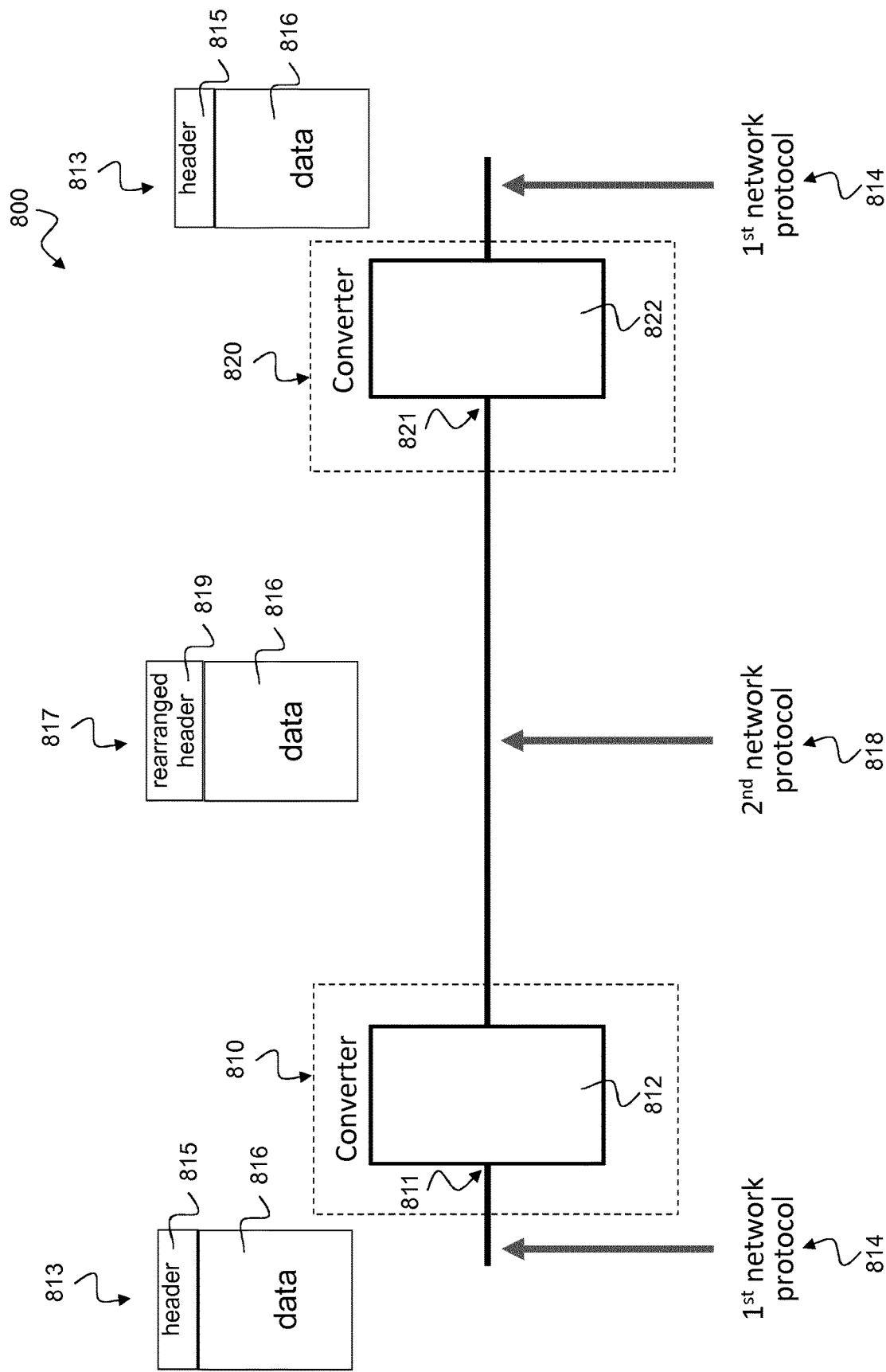
FIG. 8 shows a block diagram illustrating a general transmission system 800 with first 810 and second 820 packet data conversion devices applying header conversion according to the disclosure.

FIG. 7 shows a block diagram illustrating an OSI layer view of a transmission system 700 with an exemplary DCCP to UDP header conversion according to the disclosure.

The transmission system 700 corresponds to the system described above with respect to FIG. 1 in which the converters 112, 122 are designed to rearrange each DCCP header as described above with respect to FIG. 6 and change the protocol field in the IP header to 17, UDP (or alternatively 136, UDP-Lite) for the send converter 112 or 33, DCCP for the receive converter 122.

In the example of FIG. 7, the DCCP data stream 111 includes Layer 1, 201, Layer 2, 202, an IP layer 205 as Layer 3, a DCCP layer 206 as Layer 4 and the payload 207 as higher Layers. After the send converter 112 the converted data stream 113 includes a rearranged DCCP layer 206 that resembles a UDP layer 704 and a modified IP layer 703 in which the protocol field is changed to 17, UDP (or alternatively 136, UDP-Lite). After the receive converter 112 these rearranged layers 703, 704 are brought back to their original structure, resulting in the receive DCCP data stream 121 that has the same structure than the original DCCP data stream 111, i.e. including Layer 1, 201, Layer 2, 202, IP layer 205 as Layer 3, DCCP layer 206 as Layer 4 and the payload 207 as higher Layers.

FIG. 8 shows a block diagram illustrating a general transmission system 800 with first 810 and second 820 packet data conversion devices applying header conversion according to the disclosure. The transmission system 800 includes a first packet data conversion device 810 on the sender side (left-hand side) and a second packet data conversion device 820 on the receiver side (right-hand side). Both packet data conversion devices 810, 820 can be implemented at different network entities, e.g. a sender and a receiver, or at the same network entity, e.g. a transceiver providing both sender and receiver functionalities.

The first packet data conversion device 810 comprises a data interface 811 configured to provide first packet data 813 according to a first network protocol 814, in particular according to a Datagram Congestion Control Protocol (DCCP), wherein each packet of the first packet data (813) comprises a first packet header (815). The first packet data 813 can be generated internally or received from an external device. The first packet data conversion device 810 comprises a converter 812 configured to convert the first packet data 813 into second packet data 817. The conversion is based on rearranging contents of the first packet header 815, wherein the rearranged first packet header 819 indicates that the second packet data 817 is generated according to a second network protocol 818, in particular according to a User Datagram Protocol (UDP), e.g. as described above with respect to FIGS. 3 to 7 referred to as second solution based on packet header content rearrangement.

The conversion is done such that the length of first packet header 815 and rearranged first packet header 817 that is referred to as second packet header stays the same. I.e., a length of the rearranged first packet header 819 is equal to a length of the first packet header 815. Besides, a length of a packet of the second packet data 817 may be equal to a length of a corresponding packet of the first packet data 813, which means that the length of the whole packet is not changed by the conversion of the converter 812.

The conversion may further be based on changing a protocol field 501 of the first packet header 815 from indicating the first network protocol 814 to indicating the second network protocol 818, e.g. as described above with respect to FIGS. 5 to 7. The first packet header 815 may comprise an Internet Protocol (IP) header, e.g. an IP header 703 as described above with respect to FIG. 7. The protocol field can be a protocol field 501 of the IP header 703 as described above with respect to FIG. 5. The IP header may be an IPv4 header or an IPv6 header.

The converter 812 may be configured to change the protocol field 501 from a value of 33 indicating the DCCP protocol to a value of 17 indicating the UDP protocol (or alternatively 136 indicating the UDP-Lite protocol), e.g. as described above with respect to FIGS. 5 to 7.

The conversion may further be based on extending a checksum coverage field, CsCov, e.g. a CsCov 301 as described above with respect to FIG. 3, of a respective packet of the first packet data 813. The CsCov 301 indicates a range of the respective packet which is covered by a checksum 302, e.g. as shown in FIG. 3. The CsCov 301 may be extended to a size of a length field 401 comprised in a packet header 400 of the second network protocol, in particular a packet header of the UDP protocol, e.g. as shown in FIG. 4. For example, the CsCov 301 may be extended from 4 bit to 16 bit as shown in FIG. 6.

The conversion may further be based on rearranging at least one of a type field 305, 605, a CCVal field 306, 606 and a data offset field 307, 607 of the first packet header 815 to another position in the rearranged first packet header 819, e.g. as shown in FIGS. 3 and 6.

The rearranged first packet header 819 may include the following data fields, in particular in the following sequence: a source port 601, a destination port 602, a checksum coverage, CsCov 603, a checksum 604, a type 605, a CCVal 606, a data offset 607 and a sequence number 608, 609, e.g. as shown in FIG. 6.

The first packet data 813 and the second packet data 817 can be segmented data streams 111, 113 according to an OSI layer 4 representation, e.g. as shown in FIGS. 1 and 7.

At the receiver side (right-hand side), a second packet data conversion device 820 is used to reconvert the received packet data, referred to as second packet data 817 to its original format. The second packet data conversion device 820 includes a data interface 821 configured to receive second packet data 817 according to a second network protocol 818, in particular according to a User Datagram Protocol (UDP). Each packet of the second packet data 817 comprises a second packet header 819 and data 816. The second packet data conversion device 820 further includes a converter 822 (also denoted as a reconverter since it performs the reverse operation of the converter 812 on the sender side). The converter 822 is configured to convert the second packet data 817 into first packet data 813. The conversion is based on rearranging contents of the second packet header 819, wherein the rearranged second packet header 815 indicates that the first packet data 813 is generated according to a first network protocol 814, in particular according to a Datagram Congestion Control Protocol (DCCP).

The transmission system 800 may further comprise a sender at the left-hand side which is configured to send first packet data 813 over a transmission channel. The sender comprises the first packet data conversion device 810 as described above, which is configured to convert the first packet data 813 into second packet data 817 before sending. The transmission system 800 may further comprise a receiver at the right-hand side which is configured to receive second packet data 817 via the transmission channel. The receiver comprises the second packet data conversion device 820 as described above, which is configured to convert the second packet data 817 into first packet data 813 after reception.

The sender may for example be implemented in a mobile device such as a smartphone, e.g. a smartphone application, and the receiver may for example be implemented in a server, e.g. a download server. The sender may trigger the download server to download data. In an exemplary implementation, both, sender and receiver, can be implemented in the smartphone and both, sender and receiver, can be implemented in the download server to implement duplex transmission.

In another example, the sender may be implemented in a first network node and the receiver may be implemented in a second network node, e.g. gateways or routers in the Internet. In this example data traffic according to a first network protocol can be converted into data traffic according to a second network protocol, in order to pass a transmission path between the first network node and the second network node that is designed to transmit data traffic according to the second network protocol but to block data traffic according to the first network protocol. In this example, the first network node and the second network node may include both, sender and receiver as well for duplex transmission.

In an exemplary implementation, the transmission system 800 includes a middle box between the sender and the receiver, wherein the middle box is configured to transfer data according to the second network protocol 818, in particular according to the UDP protocol and block data according to the first network protocol 814, in particular according to a DCCP protocol. In this implementation, data traffic can pass the middle box due to the data traffic conversion.

Figure 9:
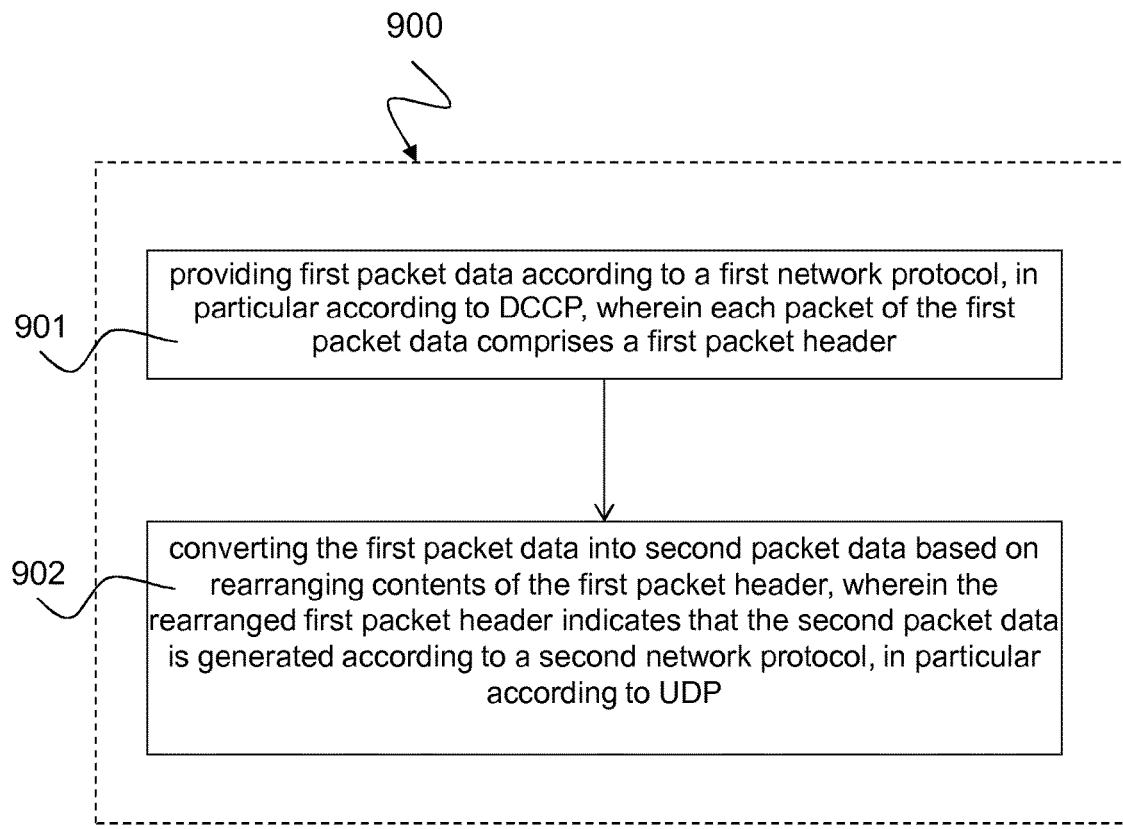
FIG. 9 shows a schematic diagram illustrating a method 900 for packet data conversion according to the disclosure.

FIG. 9 shows a schematic diagram illustrating a method 900 for packet data conversion according to the disclosure.

The method 900 includes: providing 901 first packet data 813 according to a first network protocol 814, in particular according to a Datagram Congestion Control Protocol (DCCP), e.g. as described above with respect to FIG. 8, wherein each packet of the first packet data 813 comprises a first packet header 815.

The method 900 further includes converting 902 the first packet data 813 into second packet data 817, e.g. as described above with respect to FIG. 8, wherein the converting is based on rearranging contents of the first packet header 815, wherein the rearranged first packet header 819 indicates that the second packet data is generated according to a second network protocol 818, in particular according to a User Datagram Protocol (UDP).

The method 900 may include further steps, such as, for example, according to the computing blocks described above with reference to FIGS. 6 to 8, in particular as described above with respect to the converter device 810 of FIG. 8.

Another aspect of the invention is related to a computer program product comprising program code for performing the method 900 or the functionalities described above, when executed on a computer or a processor. The method 900 may be implemented as program code that may be stored on a non-transitory computer medium. The computer program product may implement the techniques described above with respect to FIGS. 6 to 9.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A first packet data conversion device for a sender, the packet data conversion device comprising:
   a data interface configured to provide first packet data according to a first network protocol, wherein the first network protocol is a Datagram Congestion Control Protocol (DCCP), wherein each packet of the first packet data comprises a first packet header; and
   a converter configured to convert the first packet data into second packet data;
   wherein the conversion is based on rearranging contents of the first packet header, wherein the rearranged first packet header indicates that the second packet data is generated according to a second network protocol, wherein the second network protocol is a User Datagram Protocol (UDP) or a UDP-Lite protocol;
   wherein the rearranged first packet header shows at least the following bit fields in a definite sequence: a Source Port, a Destination Port, a checksum coverage field (CsCov), wherein the CsCov is extended to a size of a length field comprised in a packet header of the UDP or the UDP-Lite protocol, and a Checksum, wherein the rearranged first packet header matches a UDP header, wherein the conversion is further based on changing a protocol field of the first packet header from indicating the first network protocol to indicating the second network protocol; and wherein the conversion is further based on rearranging at least one of a type field, a CCVal field or a data offset field of the first packet header to another position in the rearranged first packet header.

2. The first packet data conversion device of claim 1, wherein the first packet header comprises an Internet Protocol (IP) header; and wherein the protocol field is a protocol field of the IP header.

3. The first packet data conversion device of claim 1, wherein the converter is configured to change the protocol field from a value of 33 indicating the DCCP protocol to a value of 17 indicating the UDP protocol or to a value of 136 indicating the UDP-Lite protocol.

4. The first packet data conversion device of claim 1, wherein the rearranged first packet header comprises the following data fields in the following sequence: the Source Port, the Destination Port, the CsCov, the Checksum, the type field, the CCVal field, the data offset field, and a sequence number.

5. The first packet data conversion device of claim 1, wherein the first packet data and the second packet data are segmented data streams according to an OSI layer 4 protocol.

6. A second packet data conversion device for a receiver, the second packet data conversion device comprising:
a data interface configured to receive second packet data according to a second network protocol, wherein the second network protocol is a User Datagram Protocol (UDP), or a UDP-Lite protocol, wherein each packet of the second packet data comprises a second packet header; and
a converter configured to convert the second packet data into first packet data,
wherein the conversion is based on rearranging contents of the second packet header in a reverse operation, wherein the rearranged second packet header indicates that the first packet data is generated according to a first network protocol, wherein the first network protocol is a Datagram Congestion Control Protocol (DCCP);
wherein the rearranged second packet header shows at least the following bit fields in a definite sequence: a Source Port of 16 bits, a Destination Port of 16 bits, a data offset field of 8 bits, a CCVal field of 4 bits, a checksum coverage field (CsCov) of 4 bits, and a Checksum of 16 bits, wherein a CsCov of the second packet header having a size of 16 bits is converted to the CsCov of the rearranged packet header having a size of 4 bits, wherein the rearranged second packet header matches a DCCP header, wherein the conversion is further based on changing a protocol field of the second packet header from indicating the second network protocol to indicating the first network protocol; and
wherein the conversion is further based on rearranging at least one of a type field, a CCVal field or a data offset field of the second packet header to another position in the rearranged second packet header.

7. A method for packet data conversion, the method comprising:
providing first packet data according to a first network protocol, wherein the first network protocol is a Datagram Congestion Control Protocol (DCCP), wherein each packet of the first packet data comprises a first packet header; and
converting the first packet data into second packet data;
wherein the converting is based on rearranging contents of the first packet header, wherein the rearranged first packet header indicates that the second packet data is generated according to a second network protocol, wherein the second network protocol is a User Datagram Protocol (UDP) or a UDP-Lite protocol;
wherein the rearranging the first packet header is performed so as to show at least the following bit fields in a definite sequence: a Source Port, a Destination Port, a checksum coverage field (CsCov), wherein the CsCov is extended to a size of a length field comprised in a packet header of the UDP or the UDP-Lite protocol, and a Checksum, wherein the converted header matches a UDP header, wherein the conversion is further based on changing a protocol field of the first packet header from indicating the first network protocol to indicating the second network protocol; and
wherein the conversion is further based on rearranging at least one of a type field, a CCVal field or a data offset field of the first packet header to another position in the rearranged first packet header.

8. A transmission system, comprising:
a sender device configured to:
provide first packet data according to a first network protocol, wherein the first network protocol is a Datagram Congestion Control Protocol (DCCP), and wherein each packet of the first packet data comprises a first packet header; and
convert the first packet data into second packet data, wherein each packet of the second packet data comprises a second packet header, wherein the conversion is based on rearranging contents of the first packet header into the second packet header, wherein the second packet header indicates that the second packet data is generated according to a second network protocol, wherein the second network protocol is a User Datagram Protocol (UDP) or a UDP-Lite protocol, wherein the second packet header shows at least the following bit fields in a definite sequence: a Source Port, a Destination Port, a checksum coverage field (CsCov), wherein the CsCov is extended to a size of a length field comprised in a packet header of the UDP or the UDP-Lite protocol, and a Checksum, wherein the rearranged first packet header matches a UDP header, wherein the conversion is further based on changing a protocol field of the first packet header from indicating the first network protocol to indicating the second network protocol, and wherein the conversion is further based on rearranging at least one of a type field, a CCVal field or a data offset field of the first packet header to another position in the second packet header; and
a receiver device configured to:
receive the second packet data according to the second network protocol, wherein each packet of the second packet data comprises a second packet header; and
reconvert the second packet data into the first packet data, wherein the reconversion is based on rearranging contents of the second packet header in a reverse operation into the first packet header, wherein the first packet header indicates that the first packet data is generated according to the first network protocol, wherein the first packet header shows at least the following bit fields in a definite sequence: a Source Port of 16 bits, a Destination Port of 16 bits, a data offset field of 8 bits, a CCVal field of 4 bits, a CsCov of 4 bits, and a Checksum of 16 bits, wherein the CsCov of the second packet header has a size of 16 bits and is converted to the CsCov of the first packet header having a size of 4 bits, wherein the first packet header matches a DCCP header, and wherein the reconversion is further based on changing the protocol field of the second packet header from indicating the second network protocol to indicating the first network protocol.

9. The transmission system of claim 8, further comprising:
a middle box between the sender device and the receiver device, wherein the middle box is configured to:
transfer data according to the second network protocol; and
block data according to the first network protocol.

\* \* \* \* \*